United States Patent Office 2,795,439
Patented June 11, 1957

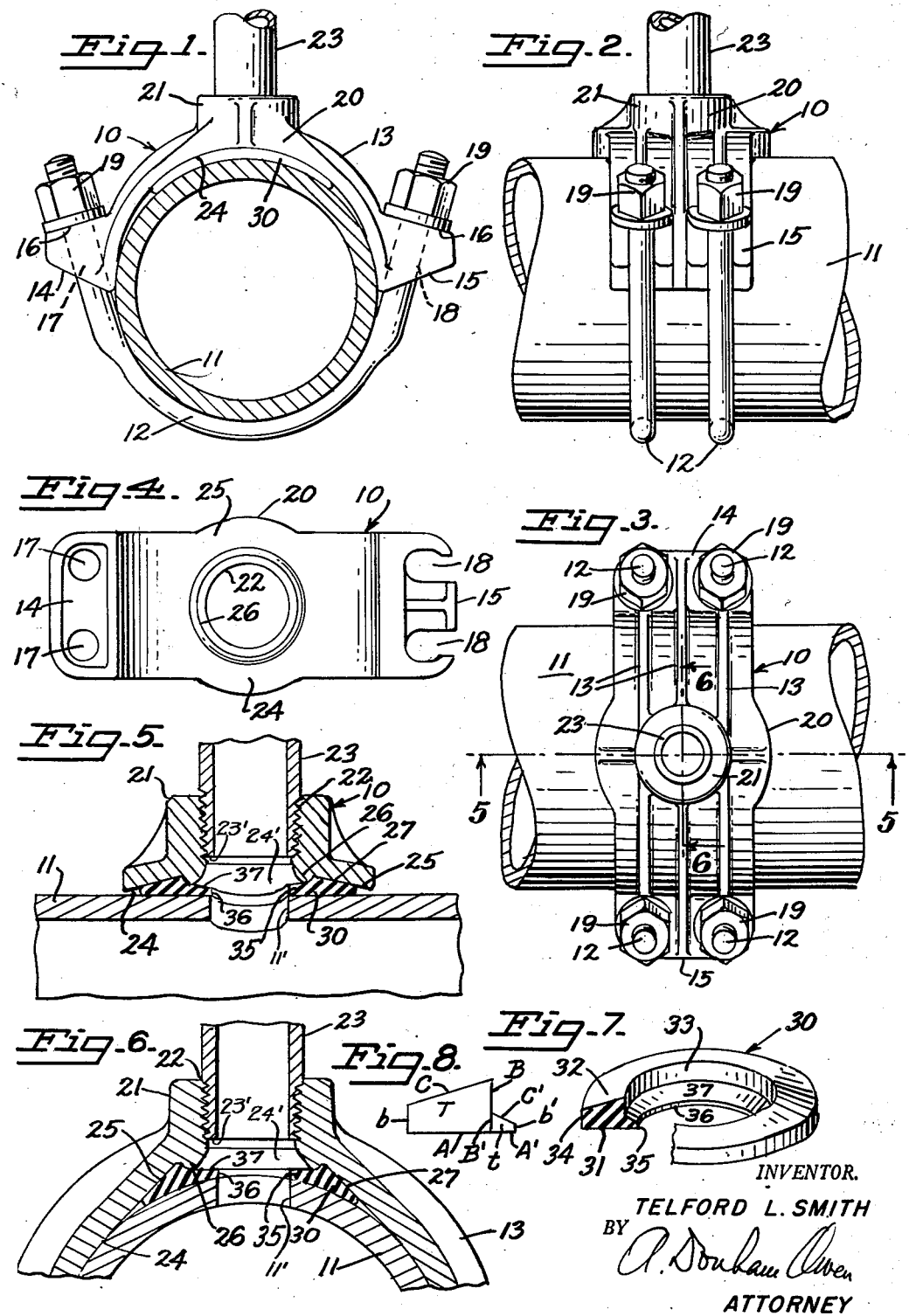

2,795,439

SADDLE CLAMP WITH FLUID PRESSURE SEAL

Telford L. Smith, South San Francisco, Calif.

Application July 10, 1953, Serial No. 367,144

3 Claims (Cl. 285—110)

This invention relates to an improved gasket for a service clamp and to an improved combination of a service clamp and gasket.

Service clamps, also called saddles or saddle clamps, are used for attaching branch pipes to a main, whether the main be conducting water, gas, or other fluid. The service clamp is secured around the upper wall of the main by strap bolts that pass around the main, in an attempt to effect a fluid-tight seal about an area of the main where a hole is to be drilled. Above and around this area the service clamp has a boss with a threaded opening therethrough. A valve may be threaded into this opening, a drilling machine attached to this valve, and a hole drilled through the wall of the main directly beneath the boss opening. When the hole is drilled, the valve is closed, the drilling machine removed, and the branch pipe attached to the valve or to the clamp.

The problem has been to achieve a perfectly fluid-tight seal, for clamps heretofore in use have leaked around their gaskets. Gaskets made of lead or other soft metal have been tried, and so have rubber O-rings, but in all these gaskets, the sealing action depended almost entirely on the mechanical pressure exerted on them by the strap bolts and their nuts. This mechanical pressure cannot be increased indefinitely without running the risk of cracking the main; consequently the sealing action of these prior art gaskets has been limited. As a result, the gaskets almost always leaked sooner or later, and their tendency to leak increased rapidly with increases in the fluid pressure.

This invention has solved the problem by providing a new gasket structure which has a novel principle of operation, particularly when used in combination with the saddle clamp of this invention, because the clamp and gasket co-act to prevent leakage, and cause the sealing effect to increase with an increase in fluid pressure, so that the tendency to leak is actually reduced by increases in fluid pressure.

The main body of the new gasket is wedge-shaped in cross-section, and is adapted to fit in a tapered recess in the saddle clamp. Integral with this main body is an inner annular lip, also wedge-shaped in cross section, but tapering radially inwardly instead of radially outwardly like the main gasket body and it extends in past an annular shoulder on the saddle. This lip is acted on by the fluid pressure to give an increase in sealing pressure with an increase in hydraulic pressure, and the main body of the gasket wedges itself more tightly both against the main and in the saddle recess, with an increase in fluid pressure.

Another way of describing the integral resilient gasket's cross-sectional shape, is to consider the main body portion as a right trapezoid, with the larger base as the radially inner axial face and the smaller base as the radially outer axial face. The radial face which lies against the main is flat and is at right angles to the bases, while the other face that slopes down and out, fits in the tapered recess in the saddle. The lip itself is also a right trapezoid, with the side that is at right-angles to the bases being the same flat radial face of the gasket. The larger base of this smaller right trapezoid is a part of the large base (or axial portion) of the main body and the smaller base is the inner axial face of the lip, with the other face sloping down between the two bases. The exposed radially inner axial face of the gasket body, the portion of the body's large base that does not coincide with the large base of the lip, is approximately the same height as the outer axial face, the body's smaller base. By this proportioning, a very tight seal is obtained and the saddle is enabled to hug the main. This kind of fit cannot be obtained when the gasket tapers out to a narrow outer edge, or with an O-ring.

The water pressure that tightens the gasket and increases the seal, acts principally on the sloping upper face of the lip and the exposed inner axial face of the gasket body.

Other objects and advantages of the invention will appear from the following illustrative description of a preferred embodiment, given in accordance with 35 U. S. C. 112.

In the drawings:

Fig. 1 is a view in elevation of a service clamp and gasket assembly embodying the invention, shown installed on a main with a branch pipe threaded into the clamp. The main is shown in section, and the end of the branch pipe is broken off.

Fig. 2 is a view in side elevation of the assembly of Fig. 1, with both the main and the branch pipe broken off.

Fig. 3 is a top plan view of the assembly shown in Figs. 1 and 2.

Fig. 4 is a bottom plan view of the saddle.

Fig. 5 is an enlarged fragmentary view in section, taken along the line 5—5 of Fig. 3.

Fig. 6 is a view similar to Fig. 5, taken along the line 6—6 of Fig. 3.

Fig. 7 is a view in perspective and partly in section of the gasket.

Fig. 8 is a diagrammatic view of the gasket cross-section.

The service clamp shown in Figs. 1–6 includes a saddle 10 held around a main 11 by a pair of metal straps 12, whose central, main-engaging portions are flattened. Depending on the size of the clamp and the size of the main, there may be one, two, or three straps 12. The saddle extends nearly halfway around the main 11, and the flattened straps engage most of the remaining half. The saddle 10 may be made from ductile iron or bronze or other strong malleable metal and is usually provided with reinforcing ribs 13. The straps 12 may be made from steel or stainless steel.

At each side of the saddle 10 is a lug 14, 15. The lugs have outwardly-sloping upper shoulders 16 and inwardly-sloping openings 17, 18 therethrough. The openings 17 on the lugs 14 are enclosed and may be circular, but the openings 18 on the lugs 15 are open-end slots. This construction enables quick installation of the clamp. The straps 12 may be secured to the lugs 14 first, by nuts 19, and then slid into the slots 18 by the open end and secured there by other nuts 19. This is much quicker than having to fit each strap into two closed openings at once or than trying to slide it into two open-end slots without having a closed opening to serve as a fulcrum. This structure makes it impossible for the straps to slip out when they are tightened. The old type made in the past by others were discontinued because the bolts would slip out. My saddle is designed so that as the strap is tightened it pulls toward the pipe.

The upper central portion 20 of the saddle 10 may be wider than the remainder of the saddle to provide for a central boss 21 into whose threaded opening 22 a branch pipe 23 may be threaded so that the end 23' of the pipe 23 will be axially spaced from the radial opening 11' in the main 11 which is axially aligned with the opening 22. The saddle 10 and main 11 define an enlarged chamber 24' which is located intermediate the central opening 22 in the saddle 10 and the radial opening 11' in the main.

The lower face 24 of the saddle 10 is provided with an annular recess 25 that receives the gasket 30. The recess is tapered outwardly, being generally wedge-shaped when seen in cross-section, with the deepest portion adjacent an annular rim or shoulder 26 which is spaced radially outwardly around the opening 22. The rim 26 is generally rounded in cross-section, as shown in the drawings. Viewed along the crest (Fig. 5) the recess 25 is shaped like a flat wedge. Viewed along the curve (Fig. 6) it is like a curved wedge. The rim 26 and the adjacent wall 27 act as a driving means against the gasket 30, and, as the clamp is tightened, they exert a greatly increased amount of pressure on the gasket 30. This pressure tends to drive the gasket 30 radially outwardly in the recess and thereby increase the sealing action.

The resilient gasket 30 (see especially Figs. 7 and 8) includes a lower radial face 31 that is substantially flat before the gasket is installed, but bends to conform to the main 11 under the compression of the clamp. The upper, generally radial face 32 of the gasket body slopes outwardly from a radially inner axial face 33 to a radially outer axial face 34. The face 32 engages the saddle wall 27, and the inner axial face 33 engages the saddle rim 26. The main body of the gasket 30 may thus be considered as a right trapezoid T (see Fig. 8), as seen in cross-section, with its inner axial face 33 the larger base B and its smaller axial face 34 the smaller base b. The flat radial face 31 lies at right angles to the bases B and b and constitutes the side A, while the sloping face 32 constitutes the fourth side C.

A very important feature of the gasket 30 is the lip 35 that extends radially inwardly from the body face 33. When the gasket 30 is positioned in the recess 27 between the saddle 10 and the main 11, the lip 35 extends radially inwardly from the rim 26 into the enlarged chamber 24' and terminates adjacent the periphery of the opening 11' in the main 11 so that the lip 35 is uncovered and exposed to pressure within the enlarged chamber 24'. The lip 35 itself is a smaller trapezoid t, as seen in cross-section, with its large base B' coinciding with the lower portion of the base B of the body T. The lip's smaller base b' is its inner axial face 36. Its right angle side A' is an inner extension of the flat face 31, and its side C' is a sloping ledge 37. The lip ledge 37 offers a considerable area against which the fluid presses, and this pressure, as well as any fluid pressure against the axial face 33 serves to seat the face 31 tightly against the main 11 and also to wedge the gasket 30 outwardly.

The proportions of the gasket 30 are of some importance. Preferably the slope of the main taper 32 is about 25°, more or less, and the exposed inner axial face 33 is about the same height as the full outer axial face 34. This is better than having the face 32 slope out to a feather edge or even a relatively narrow outer axial face 34. It gives more room for the outer rim 34 of the gasket to be compressed and enables the saddle 10 to seat against the pipe at its ends for a substantial distance at and beyond the lugs 14, 15. The ledge 37 may preferably slope more steeply than the face 32, about 30°–40° being preferred, and the inner face 36 of the lip 35 is relatively narrow but not a feather edge.

For installation, the saddle 10, with the gasket 30 inside the tapered portion 25, is placed over the main 11. One end of each strap 12 is passed through a closed opening 17 and bolted to the lug 14. The other end of each strap 12 is then slid radially into the slots 18 and bolted to the lug 15. As the nuts 19 are tightened on both sides of the saddle 10, the gasket 30 is first conformed to the main 10 and then is squeezed between the main 11 and the recess wall 27. It is wedged in tightly over a considerable area, so that a tight seal is effected even if some of the surfaces are rough.

When the clamp 10 is tightly in place, a valve may be screwed into the boss 21, and a machine may be attached to the valve to drill a hole through the main 11. When the hole is drilled, the machine is removed, and the branch pipe 23 is threaded into the valve or into the boss 21. The pressure of the fluid passing through the clamp augments the wedging action by pressing against the ledge 37 and lip 35 and also against the axial face 33, all tending to force the tapered gasket further out radially in the tapered recess 25.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

The invention claimed is:

1. A service clamp assembly for connecting a branch pipe to a radial opening in a main, including in combination a generally semi-cylindrical saddle having lugs at each side and a centrally located boss, said boss having an internally threaded central opening therethrough adapted to receive a branch pipe with the end thereof in axially spaced relation to a radial opening in a main, said saddle also having a rounded annular depending rim of uniform height and thickness closely adjacent the lower end of said boss and closely adjacent to said central opening, an annular recess on the inner surface of the saddle extending radially outwardly from said annular rim, said recess being tapered conically with respect to the inner semi-cylindrical surface of said saddle so that the recess is deepest immediately radially outwardly from said rim and decreases in depth at a substantially uniform rate radially outwardly therefrom, an enlarged chamber defined by the saddle and a main, said enlarged chamber being located intermediate the central opening in the boss and a radial opening in a main and disposed radially inwardly of said rim and annular recess, the diameter of at least the portion of said enlarged chamber nearest a radial opening in a main being greater than the diameter of the radial opening, and an annular flexible rubber gasket in said recess for sealing between said saddle and a main around a radial opening through a main's cylindrical wall, said gasket having one substantially flat-molded radial face adapted to lie against a main, the flexibility of said gasket being sufficient for installation with the flat-molded radial face assuming the cylindrical segment shape required, and with a second face opposite said flat-molded radial face lying against said saddle in said recess, said second face having a radially outer major portion and a radially inner minor portion joined by a generally axial shoulder spaced away from and extending generally perpendicularly to said flat-molded face from an apex to a base, and abutting the radially outer side of said annular rim, said outer major portion sloping uniformly down from the apex of said gasket shoulder and converging uniformly toward said flat-molded face as the major portion extends radially outwardly and terminating at the outer periphery thereof in an outer axial cylindrical wall of substantial thickness lying well within said recess, the thickness of said outer cylindrical wall being greater than that of the thickest portion of said inner minor portion, said inner minor portion extending the opposite direction from said outer major portion and sloping uniformly toward said flat-molded face from the base of said gasket shoulder to a thin inner axial cylindrical wall to form a thin generally-radially-extending sloping lip lying generally beneath said rim and extending radially inwardly therefrom into the enlarged chamber and terminating with the inner axial cylindrical wall adjacent the periphery of a radial opening in a main, said lip being exposed to pressure so that pressure against said lip and said shoulder aids in wedging said gasket radially outwardly between said saddle and toward a main so as to seal the joint therebetween.

2. A saddle clamp for connecting a branch pipe to a main comprising a semi-cylindrical member having bolt lugs on each side, a central opening therethrough adapted to receive a branch pipe with the end thereof in axially spaced relation to an opening in a main, an annular depending rim around the central opening, an arcuate, wedge-shaped recess having the deepest point thereof immediately adjacent the radially outer side of said rim and tapering radially outwardly therefrom, an enlarged chamber defined by the member and a main, said enlarged chamber being located intermediate the central opening and an opening in a main and disposed radially inwardly of the rim and wedge-shaped recess, the diameter of at least the portion of said enlarged chamber nearest an opening in a main being greater than the diameter of the opening, semi-cylindrical strap bolts joining said lugs, an annular gasket in said recess, said gasket having a normally flat lower radial face and shaped in cross-section like two connected trapezoids, a larger outer trapezoid with two axially spaced faces disposed generally perpendicular to said flat face with the outer of said axial faces defining the outer periphery of the gasket and an outwardly and uniformly downwardly sloped face opposite said flat face so that said outer periphery is the thinnest portion of said larger outer trapezoid, an inner smaller trapezoid having two axially spaced faces disposed generally perpendicular to said flat face, the outer face of said smaller trapezoid coinciding with a portion of the inner axial face of the larger trapezoid, the inner face of said smaller trazepoid defining the inner periphery of the gasket, and a face opposite said flat face sloping inwardly and downwardly from said outer axial face of the smaller trapezoid to the inner axial face thereof defining a lip disposed radially inwardly of said rim, said lip extending radially inwardly from the rim into the enlarged chamber and terminating adjacent the periphery of an opening in a main, said lip being exposed and uncovered in the enlarged chamber to pressure so that said larger outer trapezoid of said gasket is compressed and radially outwardly wedged into said recess and resiliently forced toward a main into sealing engagement between the member and main.

3. In a saddle clamp for pipes including a semi-cylindrical member for connecting a branch pipe to a main, said member having bolt lugs on each side, a central opening therethrough adapted to receive a branch pipe with the end thereof in axially spaced relation to an opening in a main which is aligned with the central opening, an annular depending rim around said central opening, an annular, wedge-shaped recess having the deepest portion thereof immediately adjacent the radially outer side of said rim and tapering radially outwardly therefrom into the normal inner cylindrical surface of the member, an enlarged chamber defined by the member and a main, said enlarged chamber being located intermediate the central opening in the member and an opening aligned therewith in a main and disposed radially inwardly of said rim and wedge-shaped recess, the diameter of at least the portion of said enlarged chamber nearest an opening in a main being greater than the diameter of the opening, semi-cylindrical strap bolts joining said lugs, an annular gasket in said recess, said gasket having, before installation, a flat lower radial face and having a cross-sectional shape of two adjacent and connected trapezoids, a larger outer trapezoid having two axially spaced faces disposed generally perpendicular to said flat face, the axially outer face being shorter than the inner face but still of substantial thickness and defining the outer periphery of the gasket, the axially inner face abutting the radial outer side of the annular rim, an outwardly and downwardly sloped upper face opposite said flat face sloping uniformly at approximately the same angle as said recess and radially substantially shorter than said recess, an inner smaller trapezoid having two axially spaced faces disposed generally perpendicular to said flat face, the outer face of said smaller trapezoid being larger than the inner face thereof and coinciding with the lower portion of the inner axial face of the larger trapezoid, the inner face of said smaller trapezoid defining the inner periphery of the gasket, and a face opposite said flat face sloping inwardly and downwardly from said outer axial face of the smaller trapezoid to the inner axial face thereof defining a lip disposed radially inwardly of said annular rim, said lip extending radially inwardly from the annular rim into the enlarged chamber and terminating therein with the inner face of the smaller trapezoid adjacent the periphery of an opening in a main with the lip being exposed and uncovered to pressure so that said larger outer trapezoid will be compressed and radially outwardly wedged in said recess and resiliently forced toward a main into sealing engagement between the member and main.

References Cited in the file of this patent

UNITED STATES PATENTS

| | | |
|---|---|---|
| 1,185,927 | O'Brien | June 6, 1916 |
| 1,603,903 | Church | Oct. 19, 1926 |
| 2,288,263 | Bostwick | June 30, 1942 |
| 2,488,064 | Mueller | Nov. 15, 1949 |
| 2,693,975 | Smith | Nov. 9, 1954 |

FOREIGN PATENTS

| | | |
|---|---|---|
| 268,923 | Great Britain | Apr. 14, 1927 |
| 588,987 | Great Britain | June 9, 1947 |
| 727,099 | France | Mar. 15, 1932 |
| 793,236 | France | Nov. 16, 1935 |